United States Patent
Pritchard

(10) Patent No.: US 7,409,233 B2
(45) Date of Patent: Aug. 5, 2008

(54) SYSTEM AND METHOD FOR PROVIDING LOCATION-BASED RESPONSES

(75) Inventor: Jeffrey A. Pritchard, Vista, CA (US)

(73) Assignee: Kyocera Wireless Corp., San Diego, CA (US)

( * ) Notice: Subject to any disclaimer, the term of this patent is extended or adjusted under 35 U.S.C. 154(b) by 704 days.

(21) Appl. No.: 09/881,532

(22) Filed: Jun. 14, 2001

(65) Prior Publication Data

US 2002/0193150 A1    Dec. 19, 2002

(51) Int. Cl.
   *H04M 1/00*    (2006.01)
   *H04Q 7/20*    (2006.01)
(52) U.S. Cl. ............... 455/567; 455/456.1; 455/456.03
(58) Field of Classification Search ............... 455/567, 455/456.1, 456.3, 456.5, 456.6, 557, 73, 455/550–1
   See application file for complete search history.

(56) References Cited

U.S. PATENT DOCUMENTS

| | | | | |
|---|---|---|---|---|
| 5,999,813 A | * | 12/1999 | Lu et al. ................... | 455/435.2 |
| 6,091,956 A | * | 7/2000 | Hollenberg ............... | 455/456.5 |
| 6,091,959 A | | 7/2000 | Souissi et al. | |
| 6,184,801 B1 | * | 2/2001 | Janky ......................... | 340/988 |
| 6,198,390 B1 | * | 3/2001 | Schlager et al. ............. | 340/540 |
| 6,343,212 B1 | * | 1/2002 | Weber et al. ............. | 455/404.1 |
| 6,701,144 B2 | * | 3/2004 | Kirbas et al. ................ | 455/417 |
| 6,947,976 B1 | * | 9/2005 | Devitt et al. ................ | 709/219 |
| 2002/0087401 A1 | * | 7/2002 | Leapman et al. ............. | 705/14 |

* cited by examiner

*Primary Examiner*—Rasha S AL-Aubaidi

(57) ABSTRACT

A system and a method for location-based responses are provided. A mobile device receives location information from, for example, a global positioning system (GPS) to determine its present location. The location is checked against target range areas corresponding to target locations programmed in the mobile device. If the determined present location of the mobile device is within a particular target range area corresponding to a particular target location, the mobile device provides the particular target response that was programmed in the mobile device to correspond to the particular target range area and the particular target location.

28 Claims, 3 Drawing Sheets

US 7,409,233 B2

SYSTEM AND METHOD FOR PROVIDING LOCATION-BASED RESPONSES

FIELD OF THE INVENTION

The present invention relates to a system and a method for providing location-based responses.

BACKGROUND OF THE INVENTION

Advances in technology have not only driven the miniaturization of devices, but have also spurred increasing mobility among users of the technology. Receiving information at the appropriate time and at the appropriate place is given a high premium in society.

Users now can receive pertinent information on demand using their cellular phones to make and to receive phone calls, to keep appointments in a calendar or even to navigate through the internet. However, such information is given to the user as a function of time, or at the request of the user. For example, the user might need to manually access a personal data assistant to retrieve such information. Thus, for example, although a user may have a notation in her calendar to pick up milk at the grocery store, this information may be forgotten when the user is actually in the vicinity of the grocery store on the drive home. The user therefore must remember to view notations when at particular locations.

In another example, if a user forgets to switch the mode of her cellular phone from a loud ringing mode to a silent vibrating mode upon entering a conference room, then an annoying disturbance may be created during a meeting if the cellular phone rings. A similar annoyance often can occur at public places such as movie theaters or restaurants. The user would find it advantageous if a system automatically turned off the cellular phone or automatically switched the ringing mode to a silent vibrating mode by sensing that the user is entering a conference room in which meetings are typically held.

Accordingly, a conventional communications device relies heavily on the memory of its user. In such a manner, there exists a need to more fully automate the response of a communications device.

SUMMARY OF THE INVENTION

The present invention alleviates to a great extent the disadvantages of the known systems and methods by providing for location-based responses. In a preferred embodiment, a system for providing location-based responses includes a mobile wireless communications system and a positioning system. The positioning system may include, for example, satellites in a global positioning system (GPS) and the mobile wireless communications system may include, for example, a cellular phone or a wireless personal data assistant (PDA).

A wireless communications device receives location information from, for example, a GPS to determine its present location. The location is checked against target range areas corresponding to target locations programmed in the wireless communications device. If the determined present location of the wireless communications device is within a particular target range area corresponding to a particular target location, the wireless communications device provides the particular target response that was programmed in the wireless communications device to correspond to the particular target range area and the particular target location.

The present invention has an advantage of automated triggering of location-based responses. Location-based responses can be, for example, a part of a personal reminder system. Furthermore, location-based responses may include automatically changing the settings of the wireless communications device (e.g., a cellular phone) so that the wireless communications device, for example, switches from a ringing mode to a vibrating mode when entering a particular target range area of a corresponding target location. Such seamless location-based responses find application in a wide range of fields.

In addition, the present invention is advantageous in that since the targets are programmed in the wireless communications system, the present invention does not have to rely upon information being successfully transmitted from, for example, a target transmitter to the wireless communications system. Furthermore, there is no need for a multitude of target transmitters, for example, a target transmitter at each target location, which can be very resource intensive.

These and other features and advantages of the present invention will be appreciated from review of the following detailed description of the invention, along with the accompanying figures in which like reference numerals refer to like parts throughout.

DETAILED DESCRIPTION OF THE INVENTION

In accordance with the present invention, a system and a method for providing location-based responses in a wireless communications system are provided.

Figure 1:
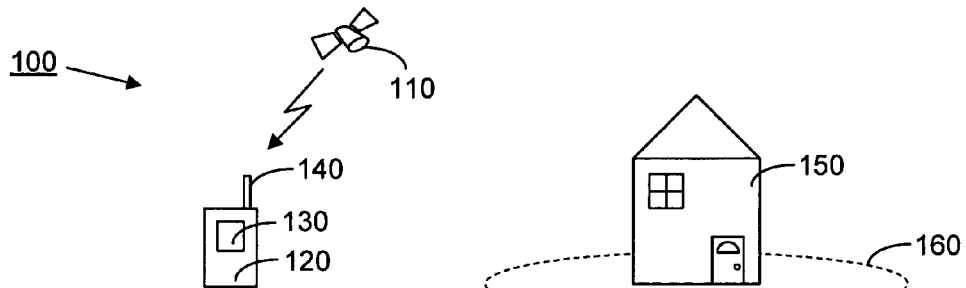
FIG. 1 shows an embodiment of a wireless communications system according to the present invention.

As illustrated in FIG. 1, an exemplary system and method of the present invention provides a wireless communications system 100 that includes a satellite 110 and a wireless communications device 120. The wireless communications device 120 is mobile and is illustrated with, for example, a display 130 and an antenna 140. The satellite 110 is in wireless communication (e.g., infrared communications, radio frequency communications, etc.) with the wireless communications device 120 via the antenna 140. The satellite 110, which may include a plurality of satellites (e.g., an array of satellites), provides the wireless communications device 120 with information relating to the location of the wireless communications device 120. In a preferred embodiment, the satellite 110 is at least one satellite in a constellation of 24 satellites in the Global Positioning System (GPS).

The wireless communications device 120 may include, for example, a wireless handheld communications device, a mobile phone, a car phone, a cellular phone, a cordless phone, a laptop computer with a wireless modem, a pager or a personal digital assistant (PDA). The present invention also contemplates other forms of wireless communications devices known to one of ordinary skill in the art.

In operation, the wireless communications device 120, which may be moving, receives location information from the satellite 110. The wireless communications device 120 then determines its present location. The wireless communications device 120 then determines whether the present location is within a range area 160 of a target location 150. If the wireless communications device 120 is within the range area 160 (e.g., a radius of 100 yards), which is, for example, centered on the target location 150 (e.g., a grocery store), then the wireless communications device provides a particular target response (e.g., a message "buy milk" appears on the display 130). In one embodiment, the range area, the target location and the target response (e.g., displaying a message) have been previously been programmed by the user of the wireless communications device 120.

Although the range area 160 is illustrated as a circle, the present invention also contemplates the range area 160 having a wide variety of shapes and sizes. For example, the range area 160 may be defined as a one-, two- or three-dimensional point, points, area, region or space. Thus, the present invention contemplates range areas such as, for example, a line segment an ellipse, an oval, a polygon, a sphere, an ellipsoid, a cube, a polyhedron or any other shapes or sets of points programmed by the user.

In one embodiment, the target response of the wireless communications service 120 is a message that appears on the display 130. Alternatively, the target response may be an audio output (e.g., a beep, musical notes and/or voice recording). The target response may also be visual such as a flashing indicator. In fact, the target response may be any combination of individual responses such as, for example, displaying a message on the display 130 and flashing an indicator disposed on the display 130 or elsewhere on the wireless communications device 120.

Furthermore, the target response may be more subtle such as, for example, the changing of parameters associated with the wireless communications device 120. For example, in the case in which the wireless communications device 120 is a cellular phone, if the cellular phone is brought within a 50-yard radius of a public library, then the target response of the cellular phone is to change the ringing mode to silent vibration mode, or to lower the volume of the ringing mode. Alternatively, the target response may be to send an e-mail message (e.g., "I am at the library") to another person (e.g., parent).

The present invention also contemplates the target response occurring when the wireless communications device 120 leaves the range area 160 of the target location 150. For example, if the wireless communications device 150 is outside of a 10-mile radius of a place of work, then the wireless communications device responds, for example, by turning itself off or forwarding all incoming calls to voice mail.

Figure 2:
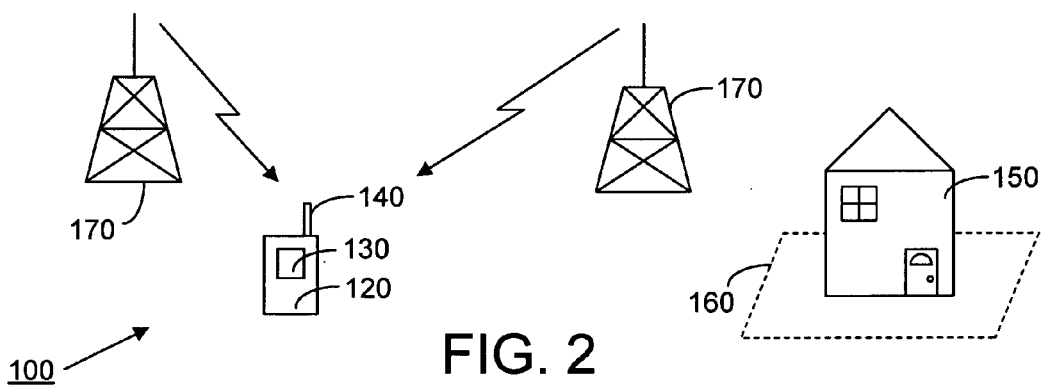
FIG. 2 shows another embodiment of a wireless communications system according to the present invention.

FIG. 2 shows another embodiment of the wireless communications system 100 according to the present invention. In one embodiment, at least one ground station 170 provides information relating to the location of the wireless communications device 120. The ground station 170 may include a plurality of ground stations in an array of ground stations. In a preferred embodiment, the ground station 170 is at least one ground station in a cellular communications network. Furthermore, the range area 160 is illustrated as a quadrilateral, but other shapes and sizes may be employed.

Figure 3:
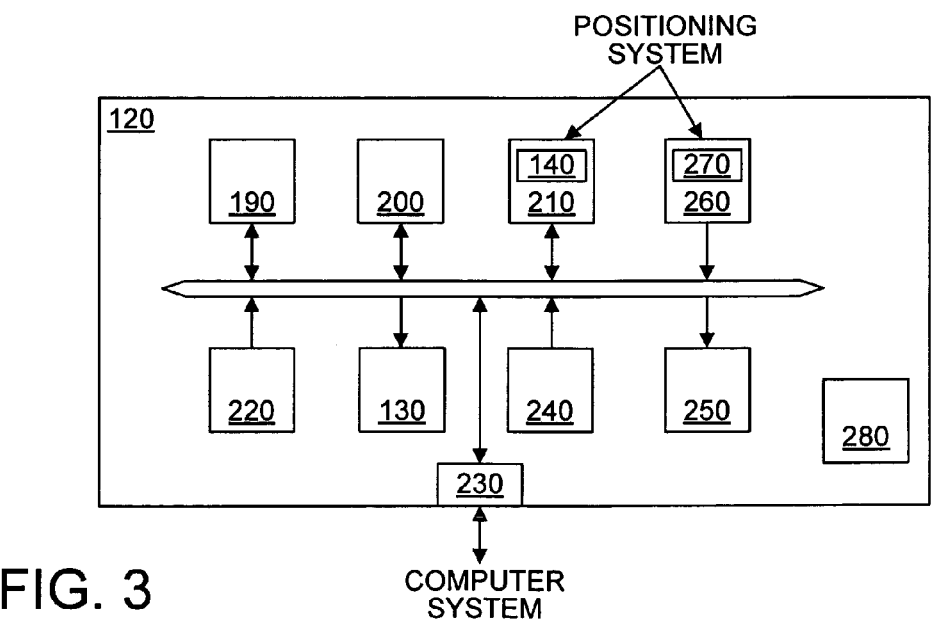
FIG. 3 shows a block representation illustrating an embodiment of a wireless communications device according to the present invention.

FIG. 3 shows a block representation illustrating an embodiment of the wireless communications device 120 according to the present invention. The wireless communications device 120 includes various components coupled via a bus 180. A controller 190 is coupled to the bus 180 and, for example, controls access to and information flow on the bus 180. A memory 200 is coupled to the bus 180 and provides temporary and/or permanent memory storage (e.g., RAM and/or ROM). The memory 200 can also include insertable and/or external memory such as, for example, magnetic-media tapes and/or disks, CD-ROMs and cartridges. Although the controller 190 and the memory 200 communicate via the bus 180, the present invention also contemplates that various components (e.g., the controller 190 and the memory 200) can communicate directly with each other without using the bus 180 or are integrated to various degrees. Thus, the controller 190 may be partially integrated, for example, to include at least a portion of the memory 200. The wireless communications device 120 may also include a transceiver 210, a microphone 220, the display 130, a port 230 (e.g., a data port), an input device 240 (e.g., a keypad), a speaker 250 and a GPS receiver 260, each of which is coupled to the bus 180. In one embodiment, the controller 190, the memory 200, the transceiver 210 and the port 230 are in two-way communication with the bus 180. The GPS receiver 260, the microphone, the display, the input device 240 and the speaker are in one-way communication with the bus 180. The wireless communications device 120 also includes a timing mechanism 280 (e.g., a clock or a timer) that is accessible by any of the components of the wireless communications device 120.

FIG. 3 illustrates one embodiment according to the present invention in which the transceiver 210 includes the antenna 140 and the GPS receiver 260 includes its own GPS antenna 270. The present invention also contemplates a partial or a complete integration of the GPS receiver 260 and the transceiver 210. For example, the GPS receiver may be adapted to use the antenna 140 of the transceiver 210, thereby eliminating the employment of a separate antenna 270 of the GPS receiver 260. The present invention also contemplates that the wireless communications device 120 not include the GPS receiver 260 (FIG. 2).

In addition, the blocks illustrated in FIG. 3 are merely general representations that are intended to include other circuitry, interfaces and sub-components that are well known. Thus, for example, the transceiver 210 might include an amplifier circuit or an analog-to-digital converter (ADC). In another embodiment in which the wireless communications device is a cellular phone, the transceiver 210 or the controller 190 might also include encoding/decoding and/or voice compression circuitry. Such interfaces and circuits are well known in the art and are not detailed further. Some examples of conventional telephony circuitry can be found, for example, in a book entitled Understanding Telephone Electronics by Stephen J. Bigelow (3d Ed. 1997), which is hereby incorporated by reference in its entirety.

Figure 4:
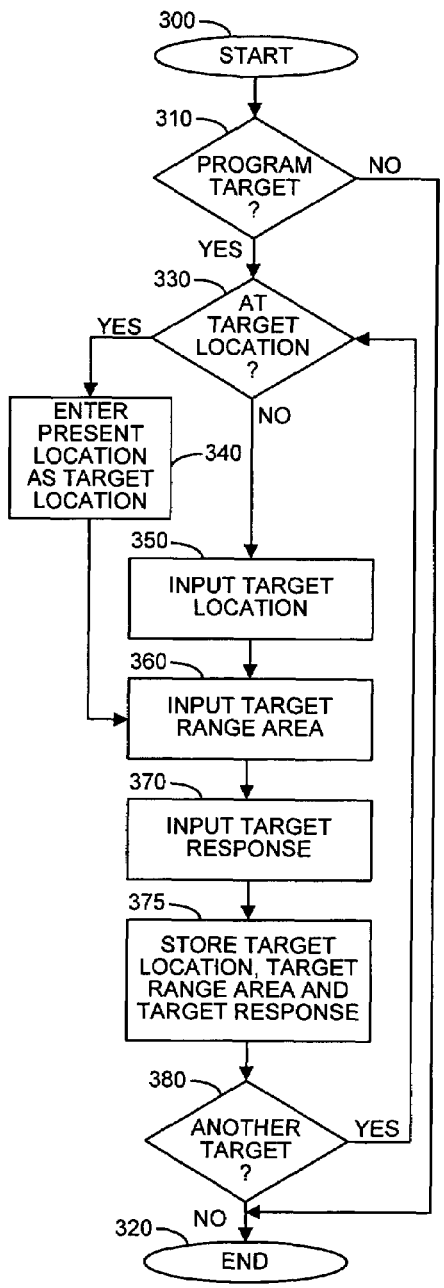
FIG. 4 shows a flow diagram illustrating an embodiment of a process for storing a new target according to the present invention.
Figure 5:
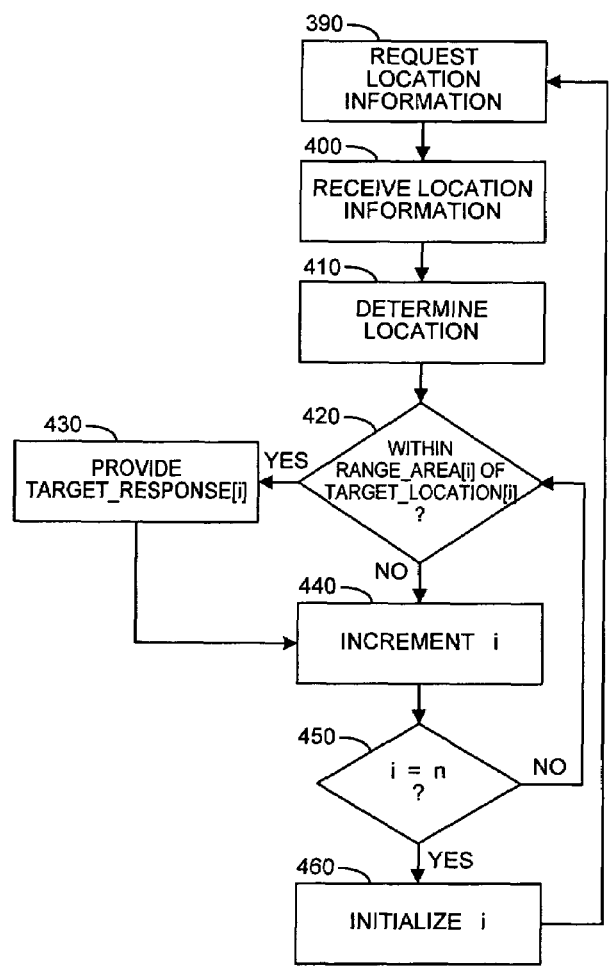
FIG. 5 shows a flow diagram illustrating an embodiment of a process for checking whether a wireless communications device is within a target range area of any target locations according to the present invention.
Figure 6:
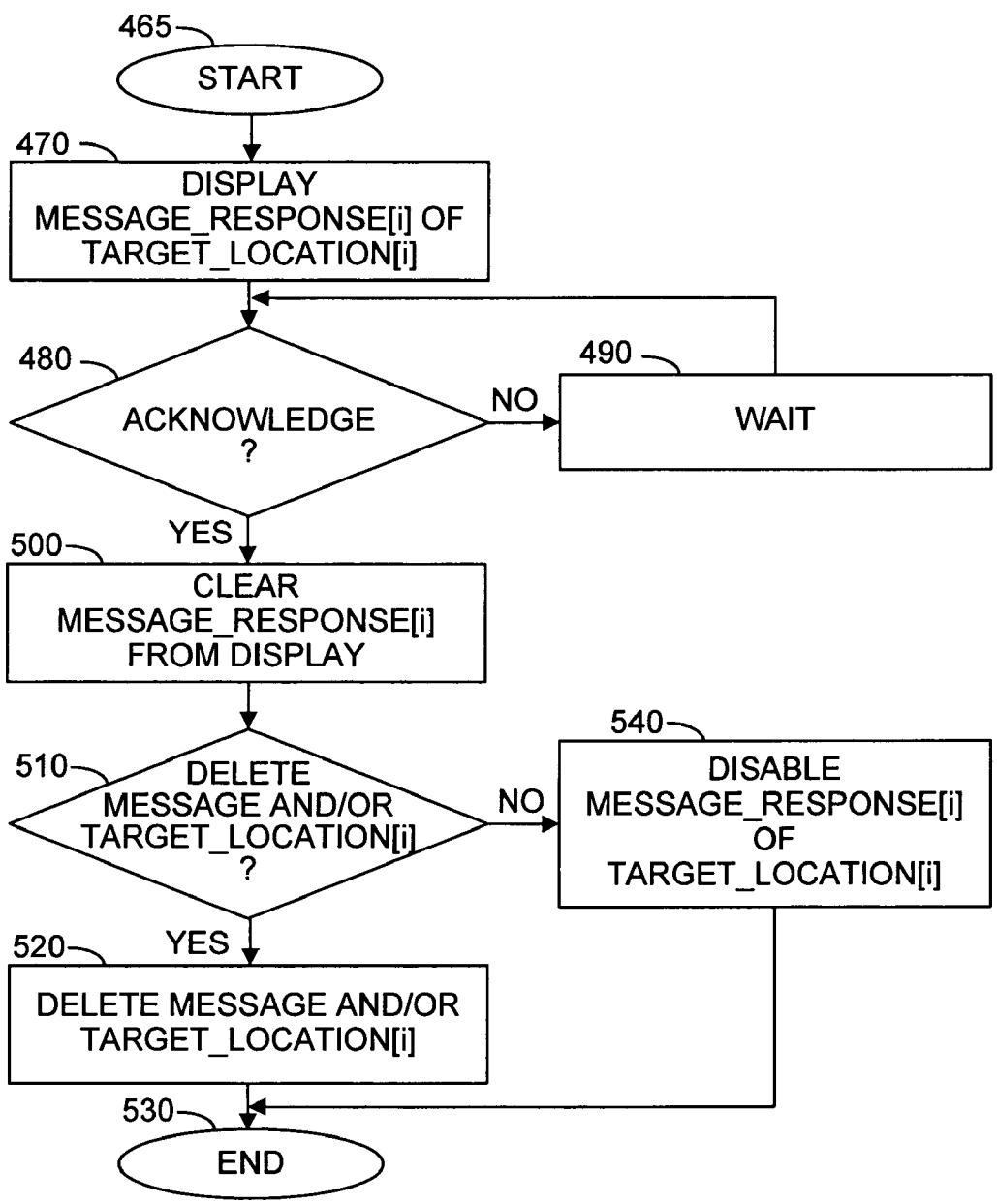
FIG. 6 shows a flow diagram illustrating an embodiment of a process for providing a corresponding message according to the present invention.

FIGS. 4-6 are flow diagrams illustrating processes that are used in the wireless communications device 120 according to the present invention. The processes may be implemented as software, hardware or some combination thereof. The processes may be implemented using the controller 190 of the wireless communications device 120 and may be stored in the controller 190, the memory 200 or some combination thereof.

FIG. 4 is a flow diagram illustrating an embodiment of a process for storing a new target according to the present invention. In step 300, a user initiates a process for storing a new target location via, for example, a user interface displayed on the display 130 or by depressing a button on the input device 240 of the wireless communications device 120. In step 310, the controller 190 checks whether a new target location is to be programmed. If no new target location is to be programmed, then the process ends (step 320). If a new target location is to be programmed, then, in step 330, the controller 190 checks whether or not the wireless communications device 120 is presently located at the new target location.

If the wireless communications device 120 is presently located at the new target location, then, in step 340, the present location is stored as the new target location. If the wireless communications device 120 is not presently located at the new target location, then, in step 350, the user inputs the new target location. The new target location can be inputted in many different ways. For example, the display 130 may display a map on which a new target location can be entered via, for example, keypad or stylus. Alternatively, a user can enter coordinates representing the new target location via, for example, the input device 240. In yet another embodiment, the user may select from a menu of options that lists locations (e.g., buildings, addresses) and corresponding coordinates via, for example, navigation keys of the input device 240.

After the target location has been entered (step 340 or step 350), then parameters of the target range area are entered (step 360). A target range area can be entered in a number of ways. For example, the user may enter a distance that represents a radius of a range area representing a circular or spherical region. Other shapes and parameters can also be entered (e.g., an ellipse or an ellipsoid can be defined by the lengths of its axes). Furthermore, shapes for the range area may be selected from a menu listing different shapes and corresponding shape parameters. Alternatively, a user may define a range area by selecting a set of points on a map (e.g., using a stylus) displayed on the display 130 that define the limits of the range area. Other parameters of the target range area may be temporal. For example, the target range area may be active only on Fridays or on weekdays between the hours of 9 A.M. and 5 P.M.

After entering the range area for the target location, the corresponding target response is entered in step 370. For example, a message can be entered which is displayed on the display 130 if the wireless communications device 120 enters the range area of the target location. In step 375, the target location, the target range area and the corresponding target response are stored in the memory 200. Alternatively, the target location, range area and the target response can be individually be stored in memory 200 as they are inputted. Subsequently, in step 380, the controller 190 checks whether or not another target is to be programmed. If another target location is to be programmed, then the process loops back to step 310; otherwise, the process ends at step 320.

The process illustrated in FIG. 4 can be carried out on the wireless communications device 120. Alternatively, the present invention also contemplates that the process can be carried out on a separate device (e.g., a computer) which may provide greater programming power and more advantageous user interfaces. FIG. 3 illustrates a computer system coupled to the wireless communications device 120 via a port 230 (e.g., a data port) that is in two-way communication with the bus 180. Thus, a computer system may be coupled with the wireless communications device 120 and assist the user in programming new target locations, target range areas and/or target responses. In another embodiment according to the present invention, a target location, target range area and target response can be programmed on a computer system separate from the wireless communications device and downloaded onto a portable memory device (e.g., a disk or cartridge). The portable memory device can then be inserted into the wireless communications device 120 and the contents of the portable memory device then can be directly accessed by the controller 190, stored in the memory 200 of the wireless communications device 120, or some combination thereof.

FIG. 5 is a flow diagram illustrating an embodiment of a process for checking whether the wireless communications device 120 is within the range areas of any of the programmed target locations in accordance with the present invention. In step 390, the controller 170 requests information relating to the present location of the wireless communications device 120. In step 400, the controller 170 receives the position information. In one embodiment, the transceiver 210 via the antenna 140 receives position information from either the satellite 110 or the ground station 170 and forwards the information to the controller 170 via the bus 180. In another embodiment, the GPS receiver 260 receives position information from the satellite 110 via the GPS antenna 270 and forwards the information to the controller 170 via the bus 180. In yet another embodiment, the GPS receiver 260 receives position information from the satellite 110 via the antenna 140 and forwards the information to the controller 170 via the bus 180. In step 410, the controller 190 determines the present location of the wireless communications device 120 as a function of the received position information.

In steps 420-450, the controller checks whether the present location of the wireless communications device 120 is within the range area of any of the programmed target locations. In the illustrated embodiment, n target locations have been programmed into the wireless communications device 120. In step 420, the controller 190 checks whether the wireless communications device 120 is within the respective range area (i.e., range_area[0]) of the first target location (i.e., target_location[0], where index i initially equals 0). If the wireless communications device 120 is within the respective range area of the first target location, then the controller 170 provides the respective target response (i.e., target_response [0]) and proceeds to step 440. If the wireless communications device 120 is not within the respective range area of the first target location, then step 440 is next. In step 440, the index variable i is incremented (e.g., by increasing the value of index i by 1). In step 450, the controller 170 checks whether all of the target locations have been checked. If the index i is not equal to n (i.e., the number of programmed target locations), then there are other target locations to check and the process jumps back to step 420.

In the second time through the loop (steps 420-450), the index i is equal to 1 and the controller 190 checks (step 420) whether or not the wireless communications device 120 is within the respective range area (i.e., range_area[1]) of the second target location (i.e., target_location[1]). If the wireless communications device 120 is within the respective range area of the second target location, then the controller 190 provides the respective target response (i.e., target_response [1]) before incrementing the index i in step 440. If the wireless communications device 120 is not within the respective range area of the second target location, then the index i is incremented in step 440.

In subsequent step 450, the controller 170 checks whether all of the targets locations (i.e., target_location[0], . . . , target_location[n−1]) have each been checked via steps 420-440. If not, then the process jumps back to step 420. If all of the target locations have been checked (i.e., index i has been incremented to the value of n), then the index i is initialized (i.e., index i is reset to 0) in step 460 and the process jumps back to step 390.

FIG. 6 is a flow diagram illustrating an embodiment of a process for providing a corresponding message according to the present invention when the wireless communications device 120 is within the respective range area of the target location. In step 465, once the controller 190 determines that the wireless communications device 120 is within the range area of respective target location, then, in step 470, the target response such as, for example, a text message that was programmed for the respective target location is displayed on the display 130 of the wireless communications device 120. In step 480 and step 490, the controller 190 waits for an acknowledgement from the user that the message has been received. The user may acknowledge the message by, for example, pressing a particular button of the input device 240 of the wireless communications device 120. After acknowledgement, in step 500, the message is cleared from the display 130. Subsequently, in step 510, the controller checks whether the message and/or the target should be deleted. If the message and/or the target should be deleted, then the message and/or the target is deleted, and the process ends in step 530.

If the message and/or the target should not be deleted, then the target message response is temporarily disabled in step 540. The temporary disablement of the target message response can be a function of position or of time. For example, the target message response can be disabled until the wireless communications device 120 moves outside the respective range area of the target location corresponding to the disabled message response. Alternative, the target message response can be disabled for a period of time such as, for example, 24 hours. The temporary disablement may conform to system default parameters, or may be particularly programmed for each target response.

FIGS. 4-6 present but one aspect of the present invention. The present invention also contemplates changing the order of the steps in the processes. For example, although FIG. 4 illustrates a process in which a target location, a target range area and a target response are inputted in that order, the present invention contemplates that the information can be inputted in another order (e.g., target range area, target location, and then target response). In another example, in process steps 420-450, the program checks through all the target locations and provides all of the triggered target responses before determining a new position of the wireless communications device 120. In the alternative, after determining that the wireless communications device 120 is within a range area of one of the target locations (step 420) and providing the corresponding target response (step 430), instead of jumping to step 440, the program can jump to step 460. Thus, a new position of the wireless communications device 120 can be determined after either checking through all of the possible target locations or after successfully triggering one of the target responses. Other groupings are also contemplated by the present invention.

Thus, it is seen that a system and a method for providing location-based responses are provided. One skilled in the art will appreciate that the present invention can be practiced by other than the preferred embodiments which are presented in this description for purposes of illustration and not of limitation, and the present invention is limited only by the claims that follow. It is noted that equivalents for the particular embodiments discussed in this description may practice the invention as well.

What is claimed is:

1. A method for providing location-based responses to a user utilizing a wireless communications device, the method comprising the steps of:

the user storing a plurality of target locations in a memory of the wireless communications device;

the user storing a plurality of target ranges in the memory, the wherein each target location corresponds to a single target range to define a surrounding target area that includes the respective target location;

the user storing a specific activity associated with each of the plurality of target locations in the memory before entering any of the plurality of target ranges;

the user storing of content related to the specific activity associated with each of plurality of target locations in the memory before entering any of the plurality of target ranges;

determining a present location utilizing a global positioning system (GPS) of the wireless communications device;

determining by iteratively processing the present location and the plurality of target areas that the present location is within the target area of two or more of the plurality of target locations utilizing a processor of the wireless communications device, wherein the maximum number of iterations is equal to the aggregate number of target locations having a target range; and outputting the content related to the specific activity associated with each of the two or more target locations on a user interface of the wireless communications device when the present location is within the target area of each of the two or more target locations without communicating with the target location.

2. The method of claim 1, wherein the user interface is a display, and wherein the indication is a text display of the specific activity.

3. A personal reminder system, comprising: a wireless communications device, comprising:

a memory for storing location information comprising:

a plurality of physical locations, a specific task associated with each physical location of the plurality of physical locations;

a user input interface for updating the information of the plurality of physical locations;

a wireless communications circuit for receiving current location at a pre-determined interval of time;

a processor for determining by an iterative process based on the number of physical locations that the current location received at the pre-determined interval of time is within a predetermined range of two or more of the plurality of physical locations, wherein the maximum number of iterations is equal to the aggregate number of the plurality of physical locations; and at least one output interface for outputting content related to each respective specific task when the current location of the wireless communications device is within the predetermined range of two or more of the plurality of physical locations without communicating with one of the physical locations wherein the specific task and the content related to the specific task is stored in the memory before the wireless communications device is within the predetermined range of one of the plurality of physical locations.

4. The personal reminder system of claim 3, wherein a proximity to one of the physical location is defined by a pre-determined area surrounding the physical location.

5. The personal reminder system of claim 3, wherein the location information further comprises at least one target range corresponding to at least one physical location of the plurality of physical locations; and wherein the processor utilizes the at least one target range to determine if the current location is proximate to one of the physical locations.

6. The personal reminder system of claim 3, wherein the at least one output interface is a speaker of the wireless communications device and the indication is an audio conveyance the specific task.

7. The personal reminder system of claim 3, wherein the at least one output interface is a display of the wireless communications device and the indication is a visual conveying the specific task.

8. The personal reminder system of claim 3, wherein the wireless communications circuit comprises a Global Positioning System (GPS) receiver for directly receiving the current location into the wireless communications device from a GPS.

9. The personal reminder system of claim 3, wherein the current location is received through the wireless communications circuit from a wireless communications network.

10. A wireless device for communicating with a wireless communications network, the wireless device comprising:
   an antenna circuit for wireless communications with the wireless communications network and for receiving location information from a positioning system;
   a memory for storing a plurality "n" of target locations, each target location of the n target locations having a range area centered on the each target location, and a target message for the each target location, the target message for each target location comprising a specific activity associated with the each target location, the target message being entered into the memory before the wireless device is proximate to the range area;
   a user input device for inputting the each target location and for inputting the each target message before the wireless device is within the range area;
   at least one output device; and
   a controller connected to the antenna circuit and the memory, the controller for periodically requesting the location information from the positioning system, for determining by an iterative process based on the aggregate number of target locations whether the received location information is within a range area of two or more of the "n" target locations, and for outputting the target message on the at least one output device without communicating with any one of the plurality of target locations if the received location information indicates that the wireless device is within the range area of two or more of the "n" target locations, wherein the maximum number of iterations is "n".

11. The wireless device of claim 10, wherein the target message is a display message, and wherein the at least one output device is a display for displaying the display message.

12. The wireless device of claim 10, wherein the wireless device further comprises a global positioning system (GPS) receiver, and wherein the positioning system is a global positioning system (GPS).

13. The wireless device of claim 10, wherein the wireless communications network comprises the positioning system.

14. The wireless device of claim 13, wherein the wireless communications network is a cellular communications network.

15. The wireless device of claim 10, wherein the wireless device is a wireless handheld communications device, a laptop computer with a wireless modem, a pager or a personal digital assistant (PDA).

16. The wireless device of claim 10, wherein the range area is described as a two-dimensional shape, and wherein the each target location is located inside the two-dimensional shape.

17. The wireless device of claim 10, wherein the range area is described as a three-dimensional space, and wherein the each target location is located inside the three-dimensional space.

18. The wireless device of claim 10, wherein the target range area is time sensitive.

19. The wireless device of claim 10, wherein the each target message is an audio message.

20. The wireless device of claim 19, wherein the at least one output device is a speaker for sounding the audio message.

21. A method for providing location-based information on a wireless communications device, the method comprising the steps of:
   storing a plurality of target locations in a memory of the wireless communications device;
   storing two or more target ranges for a first target location in the memory;
   calculating a first target area based on a first target location and a first target range;
   storing the first target area in the memory;
   associating the first target area with the first target location;
   storing a first specific activity associated with the first target location in the memory, wherein the first specific activity is stored before entering the first target area;
   storing content related to the first specific activity associated with the first target location in the memory, wherein the content related to the first specific activity is stored before entering the first target area;
   calculating a second target area based on the first target location and a second target range;
   storing the second target area in the memory;
   associating the second target area with the first target location;
   storing a second specific activity associated with the first target location in the memory, wherein the second specific activity is stored before entering the second target area;
   storing content related to the second specific activity associated with the first target location in the memory, wherein the content related to the second specific activity is stored before entering the second target area;
   determining a present location of the wireless communications device;
   determining that the present location is within the first target area and the second target area utilizing a processor of the wireless communications device; and
   providing the content related to the first specific activity and the second specific activity associated with the first target location of the wireless communications device when the present location is within the first target area and the second target area without communicating with the target location.

22. The method of claim 21, wherein the content related to the specific activity is a visual display on a user interface.

23. The method of claim 21, wherein the content related to the specific activity causes a physical vibration of the wireless communications device.

24. The method of claim 21, wherein the content related to the specific activity causes an audible tone.

25. The method of claim 21, wherein the content related to the specific activity is a visual display on a user interface and causes a physical vibration of the wireless communications device.

26. The method of claim 21, wherein the content related to the specific activity causes an audible tone and a physical vibration of the wireless communications device.

27. The method of claim 21, wherein the content related to the specific activity is a visual display on a user interface and causes an audible tone.

28. A method for providing location-based information on a wireless communications device, the method comprising the steps of:
- receiving input to the wireless communications device indicating a new target location;
- determining whether a current location for the wireless communications device is the new target location;
- storing the current location as the new target location, if the current location is the new target location;
- prompting a user to enter the new target location, if the current location is not the new target location;
- receiving a geographic and a temporal range area associated with the new target location;
- prompting a user to enter a target response associated with the target location;
- storing the target response and the geographic and temporal range areas in a memory of the wireless communications device along with the target location;
- identifying multiple "n" target locations and storing the target response, the geographic and temporal range areas in a memory of the wireless communications device for the "n" target locations;
- determining a present location of the wireless communications device;
- determining by an iterative process based on the aggregate number of target locations whether the present location is within the geographic range area of one of the "n" target locations, wherein the maximum number of iterations is "n";
- determining by an iterative process whether a present time is within the temporal range area of one of the "n" target locations; and
- providing the target message if the present location is within the geographic range area and the present time is within the temporal range area of one of the "n" target locations without communicating with the target location.

* * * * *